(12) United States Patent
Vandenbout

(10) Patent No.: US 10,195,965 B2
(45) Date of Patent: Feb. 5, 2019

(54) HEIGHT-ADJUSTABLE ROTATABLE CHAIR OVERLAY ASSEMBLY

(71) Applicant: Beverly Vandenbout, Rochester, NY (US)

(72) Inventor: Beverly Vandenbout, Rochester, NY (US)

( * ) Notice: Subject to any disclaimer, the term of this patent is extended or adjusted under 35 U.S.C. 154(b) by 105 days.

(21) Appl. No.: 15/299,804

(22) Filed: Oct. 21, 2016

(65) Prior Publication Data

US 2018/0111512 A1 Apr. 26, 2018

(51) Int. Cl.
- *B60N 2/14* (2006.01)
- *B60N 2/16* (2006.01)
- *B60N 2/24* (2006.01)

(52) U.S. Cl.
CPC ............... *B60N 2/14* (2013.01); *B60N 2/16* (2013.01); *B60N 2/24* (2013.01)

(58) Field of Classification Search
CPC .............. B60N 2/14; B60N 2/24; B60N 2/16
USPC ............ 297/256.12, 344.21, 344.22, 344.26
See application file for complete search history.

(56) References Cited

U.S. PATENT DOCUMENTS

| | | | |
|---|---|---|---|
| 4,971,392 A * | 11/1990 | Young | B60N 2/2821 297/256.12 |
| 5,318,339 A | 6/1994 | Cherniak | |
| 6,557,919 B2 | 5/2003 | Suga et al. | |
| 6,981,745 B2 | 1/2006 | Rees | |
| D516,824 S | 3/2006 | Murphy | |
| 7,073,859 B1 * | 7/2006 | Wilson | B60N 2/0232 297/256.12 |
| 7,159,940 B1 | 1/2007 | Atkins | |
| 7,204,554 B2 | 4/2007 | Wieclawski | |
| 9,474,376 B2 * | 10/2016 | Drew | A47C 3/18 |
| 2003/0230920 A1 * | 12/2003 | Itou | B60N 2/06 297/344.21 |

FOREIGN PATENT DOCUMENTS

WO WO2015030608 3/2015

* cited by examiner

*Primary Examiner* — Anthony D Barfield

(57) ABSTRACT

A height-adjustable rotatable chair overlay for facilitating entry to and exit from a vehicle by a user includes a seat. A lift is coupled to and extends from a bottom of the seat. The lift is selectively extensible. A turntable is rotationally coupled to the lift distal from the seat. Each of a pair of arms is coupled to a top of the seat. The arms are positioned singly proximate to a left side and a right side of the seat. The turntable is positioned on the lift such that the seat is selectively rotatable relative to the turntable. The arms are positioned on the seat such that the arms are configured to assist a user in entering and exiting the seat. The lift is positioned on the seat such that the lift is positioned to extend and retract. The seat is raised and lowered relative to the turntable.

16 Claims, 4 Drawing Sheets

HEIGHT-ADJUSTABLE ROTATABLE CHAIR OVERLAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to chair overlay overlays and more particularly pertains to a new chair overlay for facilitating entry to and exit from a vehicle by a user.

BRIEF SUMMARY OF THE INVENTION

An embodiment of the disclosure meets the needs presented above by generally comprising a seat. A lift is coupled to and extends from a bottom of the seat. The lift is selectively extensible. A turntable is rotationally coupled to the lift distal from the seat. Each of a pair of arms is coupled to a top of the seat. The arms are positioned singly proximate to a left side and a right side of the seat. The turntable is positioned on the lift such that the seat is selectively rotatable relative to the turntable. The arms are positioned on the seat such that the arms are configured to assist a user in entering and exiting the seat. The lift is positioned on the seat such that the lift is positioned to extend and retract. The seat is raised and lowered relative to the turntable.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
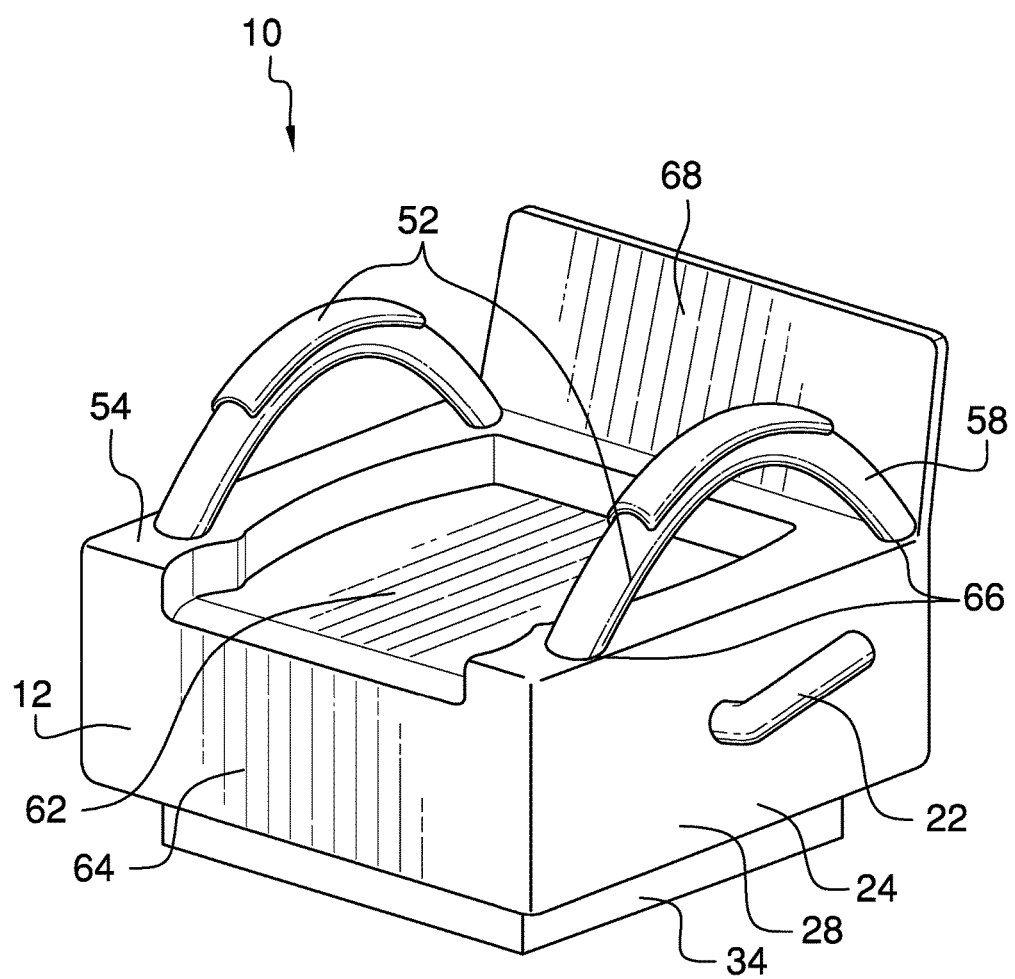
FIG. 1 is an isometric perspective view of a height-adjustable rotatable chair overlay according to an embodiment of the disclosure.
Figure 2:
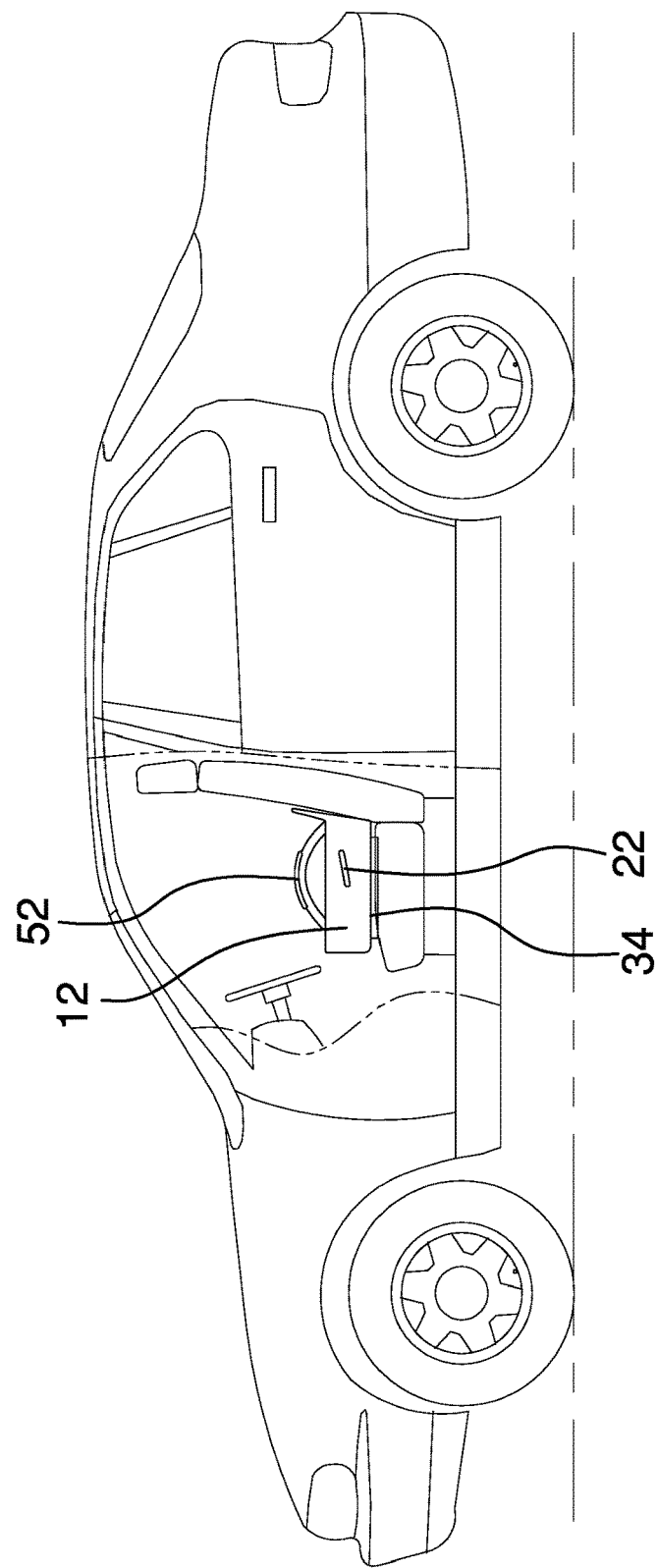
FIG. 2 is a side view of an embodiment of the disclosure.
Figure 3:
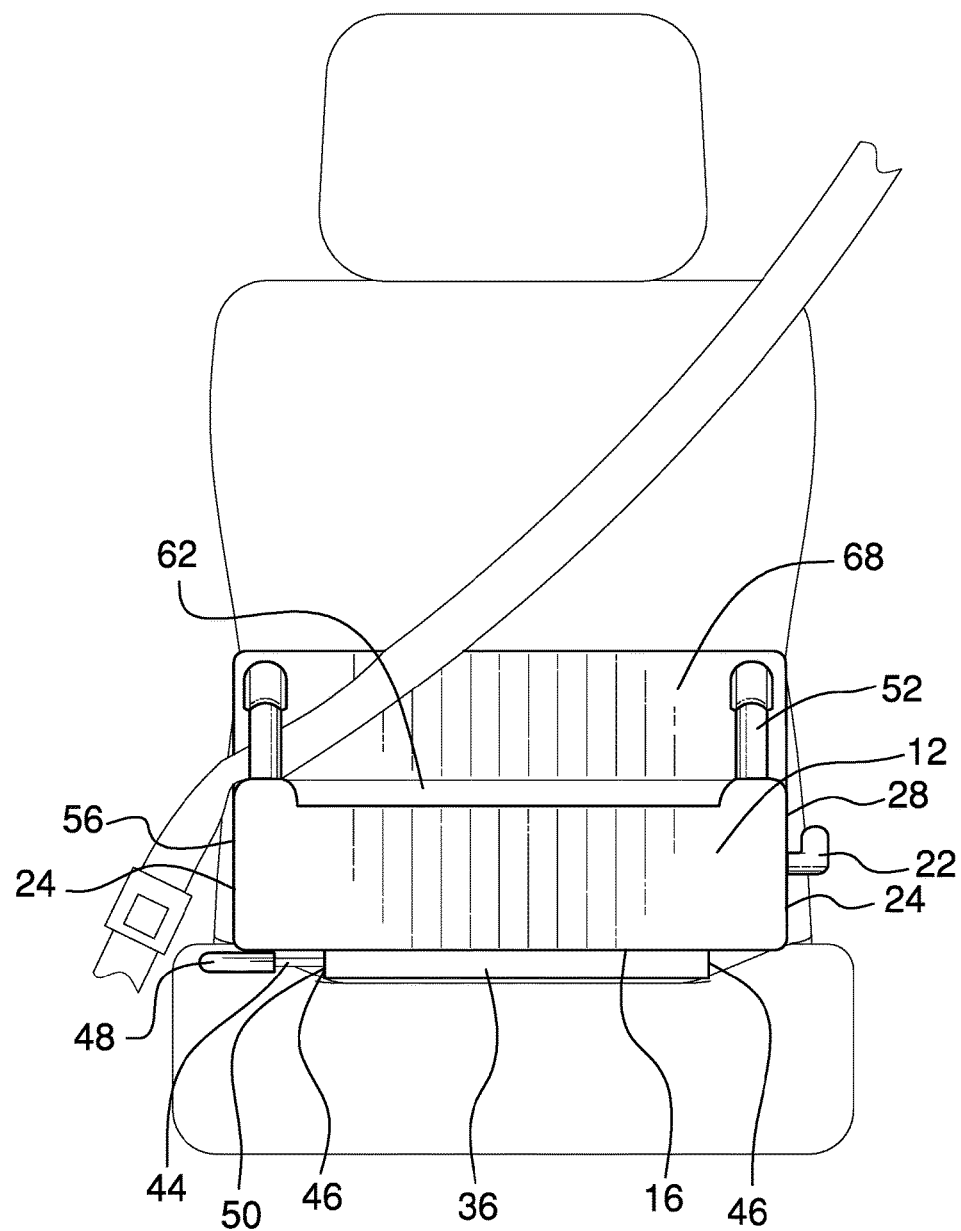
FIG. 3 is a front view of an embodiment of the disclosure.
Figure 4:
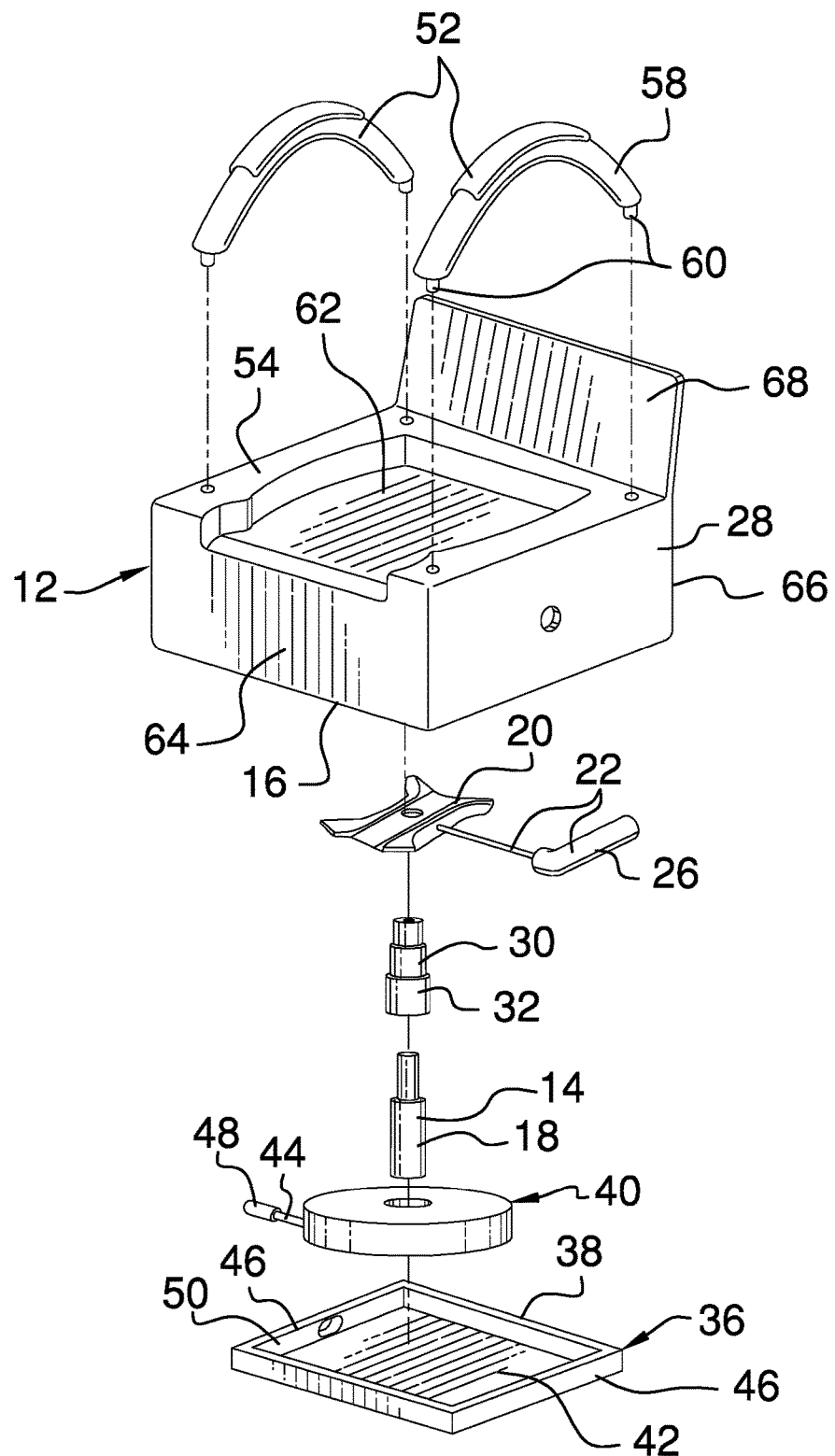
FIG. 4 is an exploded view of an embodiment of the disclosure.

With reference now to the drawings, and in particular to FIGS. 1 through 4 thereof, a new chair overlay embodying the principles and concepts of an embodiment of the disclosure and generally designated by the reference numeral 10 will be described.

As best illustrated in FIGS. 1 through 4, the height-adjustable rotatable chair overlay 10 generally comprises a seat 12. In one embodiment, the seat 12 is substantially rectangularly box shaped. In another embodiment, the seat 12 is padded.

A lift 14 is coupled to and extends from a bottom 16 of the seat 12. The lift 14 is selectively extensible. In one embodiment, the lift 14 comprises a gas spring 18. A mounting plate 20 is coupled to the bottom 16 of the seat 12. The mounting plate 20 is positioned on the seat 12 such that the mounting plate 20 is positioned to couple to the lift 14.

A controller 22 is coupled to a respective opposing side 24 of the seat 12. The controller 22 is operationally coupled to the lift 14. The controller 22 is positioned on the seat 12 such that the controller 22 is positioned to motivate the lift 14 to extend and retract relative to the seat 12. In one embodiment, the controller 22 comprises a lever 26 that extends from a right side 28 of the seat 12.

A covering 30 is positioned over the lift 14. The covering 30 is selectively extensible. The covering 30 is positioned over the lift 14 such that the covering 30 covers the lift 14 when the lift 14 is extended and such that the covering 30 covers the lift 14 when the lift 14 is retracted. In one embodiment, the covering 30 comprises a bellows 32.

A turntable 34 is rotationally coupled to the lift 14 distal from the seat 12. The turntable 34 is positioned on the lift 14 such that the seat 12 is selectively rotatable relative to the turntable 34.

In one embodiment, the turntable 34 comprises a housing 36. The housing 36 is substantially rectangularly box shaped. The housing 36 has an upper face 38. The upper face 38 is open. A disk 40 is positioned in the housing 36 and is rotationally coupled to a lower face 42 of the housing 36. The disk 40 is coupled to the lift 14 distal from the seat 12. A lock bar 44 is positioned through a respective opposing face 46 of the housing 36 such that a handle 48 of the lock bar 44 protrudes from the respective opposing face 46. The lock bar 44 is operationally coupled to the disk 40. The handle 48 is positioned on the lock bar 44 such that the lock bar 44 is positioned to reversibly couple to the disk 40, such that the disk 40 is selectively rotatable relative to the housing 36. In another embodiment, the lock bar 44 is positioned through a left face 50 of the housing 36.

Each of a pair of arms 52 is coupled to a top 54 of the seat 12. The arms 52 are positioned singly proximate to a left side 56 and the right side 28 of the seat 12. The arms 52 are positioned on the seat 12 such that the arms 52 are configured to assist a user in entering and exiting the seat 12. In one embodiment, the arms 52 are padded. In another embodiment, the arms 52 are reversibly couplable to the seat 12. Each arm 52 comprises a rod 58 that has opposing ends 60. The rod 58 is arcuate. The opposing ends 60 are coupled to the top 54 of the seat 12.

A recess 62 is positioned in the top 54 of the seat 12. The recess 62 extends from a front 64 of the seat 12 to proximate to a rear 66 of the seat 12. The recess 62 extends from proximate to the opposing sides 24 of the seat 12.

A back 68 is coupled to the seat 12. The back 68 extends from the top 54 of the seat 12 substantially coplanarly with the rear 66 of the seat 12.

In use, the handle 48 is positioned on the lock bar 44 such that the lock bar 44 is positioned to reversibly couple to the disk 40. The disk 40 is selectively rotatable relative to the housing 36. The arms 52 are positioned on the seat 12 such that the arms 52 are configured to assist a user in entering and exiting the seat 12. The controller 22 is positioned on the seat 12 such that the controller 22 is positioned to motivate the lift 14 to extend and retract relative to the seat 12. The seat 12 is raised and lowered relative to the turntable 34.

With respect to the above description then, it is to be realized that the optimum dimensional relationships for the parts of an embodiment enabled by the disclosure, to include variations in size, materials, shape, form, function and manner of operation, overlay and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A height-adjustable rotatable chair overlay comprising:
   a seat;
   a lift coupled to and extending from a bottom of said seat, said lift being selectively extensible, said lift comprising a gas spring;
   a turntable rotationally coupled to said lift distal from said seat;
   a pair of arms coupled to a top of said seat, said arms being positioned singly proximate to a left side and a right side of said seat; and
   wherein said turntable is positioned on said lift such that said seat is selectively rotatable relative to said turntable, wherein said arms are positioned on said seat such that said arms are configured to assist a user in entering and exiting said seat, wherein said lift is positioned on said seat such that said lift is positioned to extend and retract, such that said seat is raised and lowered relative to said turntable.

2. The overlay of claim 1, further including said seat being substantially rectangularly box shaped.

3. The overlay of claim 1, further including said seat being padded.

4. The overlay of claim 1, further including a mounting plate coupled to said bottom of said seat, wherein said mounting plate is positioned on said seat such that said mounting plate is positioned to couple to said lift.

5. A height-adjustable rotatable chair overlay comprising:
   a seat;
   a lift coupled to and extending from a bottom of said seat, said lift being selectively extensible;
   a turntable rotationally coupled to said lift distal from said seat;
   a pair of arms coupled to a top of said seat, said arms being positioned singly proximate to a left side and a right side of said seat;
   wherein said turntable is positioned on said lift such that said seat is selectively rotatable relative to said turntable, wherein said arms are positioned on said seat such that said arms are configured to assist a user in entering and exiting said seat, wherein said lift is positioned on said seat such that said lift is positioned to extend and retract, such that said seat is raised and lowered relative to said turntable; and
   a controller, said controller being coupled to a respective opposing side of said seat, said controller being operationally coupled to said lift, wherein said controller is positioned on said seat such that said controller is positioned to motivate said lift to extend and retract relative to said seat.

6. The overlay of claim 5, further including said controller comprising a lever extending from a right side of said seat.

7. A height-adjustable rotatable chair overlay comprising:
   a seat;
   a lift coupled to and extending from a bottom of said seat, said lift being selectively extensible;
   a turntable rotationally coupled to said lift distal from said seat;
   a pair of arms coupled to a top of said seat, said arms being positioned singly proximate to a left side and a right side of said seat;
   wherein said turntable is positioned on said lift such that said seat is selectively rotatable relative to said turntable, wherein said arms are positioned on said seat such that said arms are configured to assist a user in entering and exiting said seat, wherein said lift is positioned on said seat such that said lift is positioned to extend and retract, such that said seat is raised and lowered relative to said turntable; and
   a covering positioned over said lift, said covering being selectively extensible, wherein said covering is positioned over said lift such that said covering covers said lift when said lift is extended and such that said covering covers said lift when said lift is retracted.

8. The overlay of claim 7, further including said covering comprising a bellows.

9. A height-adjustable rotatable chair overlay comprising:
   a seat;
   a lift coupled to and extending from a bottom of said seat, said lift being selectively extensible;

a turntable rotationally coupled to said lift distal from said seat;

a pair of arms coupled to a top of said seat, said arms being positioned singly proximate to a left side and a right side of said seat;

wherein said turntable is positioned on said lift such that said seat is selectively rotatable relative to said turntable, wherein said arms are positioned on said seat such that said arms are configured to assist a user in entering and exiting said seat, wherein said lift is positioned on said seat such that said lift is positioned to extend and retract, such that said seat is raised and lowered relative to said turntable; and said turntable comprising:
  a housing, said housing being substantially rectangularly box shaped, said housing having an upper face, said upper face being open;
  a disk positioned in said housing and rotationally coupled to a lower face of said housing, said disk being coupled to said lift distal from said seat;
  a lock bar positioned through a respective opposing face of said housing such that a handle of said lock bar protrudes from said respective said opposing face, said lock bar being operationally coupled to said disk; and
  wherein said handle is positioned on said lock bar such that said lock bar is positioned to reversibly couple to said disk, such that said disk is selectively rotatable relative to said housing.

10. The overlay of claim 9, further including said lock bar being positioned through a left face of said housing.

11. The overlay of claim 1, further including said arms being padded.

12. A height-adjustable rotatable chair overlay comprising:
  a seat;
  a lift coupled to and extending from a bottom of said seat, said lift being selectively extensible;
  a turntable rotationally coupled to said lift distal from said seat;
  a pair of arms coupled to a top of said seat, said arms being positioned singly proximate to a left side and a right side of said seat, said arms being reversibly couplable to said seat; and
  wherein said turntable is positioned on said lift such that said seat is selectively rotatable relative to said turntable, wherein said arms are positioned on said seat such that said arms are configured to assist a user in entering and exiting said seat, wherein said lift is positioned on said seat such that said lift is positioned to extend and retract, such that said seat is raised and lowered relative to said turntable.

13. The overlay of claim 1, further including each said arm comprising a rod having opposing ends, said rod being arcuate, said opposing ends being coupled to said top of said seat.

14. The overlay of claim 1, further including a recess positioned in said top of said seat, said recess extending from a front of said seat to proximate to a rear of said seat, said recess extending from proximate to opposing sides of said seat.

15. The overlay of claim 1, further including a back coupled to said seat, said back extending from said top of said seat substantially coplanarly with a rear of said seat.

16. A height-adjustable rotatable chair overlay comprising:

a seat, said seat being substantially rectangularly box shaped, said seat being padded;

a lift coupled to and extending from a bottom of said seat, said lift being selectively extensible, said lift comprising a gas spring;

a mounting plate coupled to said bottom of said seat, wherein said mounting plate is positioned on said seat such that said mounting plate is positioned to couple to said lift;

a controller, said controller being coupled to a respective opposing side of said seat, said controller being operationally coupled to said lift, wherein said controller is positioned on said seat such that said controller is positioned to motivate said lift to extend and retract relative to said seat, said controller comprising a lever extending from a right side of said seat;

a covering positioned over said lift, said covering being selectively extensible, wherein said covering is positioned over said lift such that said covering covers said lift when said lift is extended and such that said covering covers said lift when said lift is retracted, said covering comprising a bellows;

a turntable rotationally coupled to said lift distal from said seat, wherein said turntable is positioned on said lift such that said seat is selectively rotatable relative to said turntable, said turntable comprising:
  a housing, said housing being substantially rectangularly box shaped, said housing having an upper face, said upper face being open,
  a disk positioned in said housing and rotationally coupled to a lower face of said housing, said disk being coupled to said lift distal from said seat,
  a lock bar positioned through a respective opposing face of said housing such that a handle of said lock bar protrudes from said respective said opposing face, said lock bar being operationally coupled to said disk, and
  wherein said handle is positioned on said lock bar such that said lock bar is positioned to reversibly couple to said disk, such that said disk is selectively rotatable relative to said housing, said lock bar being positioned through a left face of said housing;

a pair of arms coupled to a top of said seat, said arms being positioned singly proximate to a left side and a right side of said seat, wherein said arms are positioned on said seat such that said arms are configured to assist a user in entering and exiting said seat, said arms being padded, said arms being reversibly couplable to said seat, each said arm comprising a rod having opposing ends, said rod being arcuate, said opposing ends being coupled to said top of said seat;

a recess positioned in said top of said seat, said recess extending from a front of said seat to proximate to a rear of said seat, said recess extending from proximate to opposing sides of said seat;

a back coupled to said seat, said back extending from said top of said seat substantially coplanarly with said rear of said seat; and wherein said handle is positioned on said lock bar such that said lock bar is positioned to reversibly couple to said disk, such that said disk is selectively rotatable relative to said housing, wherein said arms are positioned on said seat such that said arms are configured to assist a user in entering and exiting said seat, wherein said controller is positioned on said seat such that said controller is positioned to motivate said lift to extend and retract relative to said seat, such that said seat is raised and lowered relative to said turntable.

* * * * *